US012797803B2

(12) United States Patent
Borges et al.

(10) Patent No.: US 12,797,803 B2
(45) Date of Patent: Nov. 17, 2026

(54) PROCESSES FOR PREPARING ASYMMETRIC HOLLOW FIBER MEMBRANES, ASYMMETRIC HOLLOW FIBER MEMBRANES AND USE OF ASYMMETRIC HOLLOW FIBER MEMBRANES

(71) Applicants: PETRÓLEO BRASILEIRO S.A.—PETROBRAS, Rio de Janeiro (BR); PAM MEMBRANAS SELETIVAS LTDA, Rio de Janeiro (BR)

(72) Inventors: Cristiano Piacsek Borges, Rio de Janeiro (BR); Yuri Gomes Leite E Silva, Rio de Janeiro (BR); Nicolas Roger Jean-Daniel Mermier, Rio de Janeiro (BR); Filippe Machado De Jesus, Rio de Janeiro (BR); Ana Paula Santana Musse, Rio de Janeiro (BR); Leonardo da Silva Ribeiro, Rio de Janeiro (BR); Cassiano Gomes Aimoli, Santos (BR); Dilson Da Costa Maia Filho, Rio de Janeiro (BR)

(73) Assignees: PETRÓLEO BRASILEIRO S.A.—PETROBRAS, Rio de Janeiro (BR); PAM MEMBRANAS SELETIVAS LTDA, Rio de Janeiro (BR)

( * ) Notice: Subject to any disclaimer, the term of this patent is extended or adjusted under 35 U.S.C. 154(b) by 226 days.

(21) Appl. No.: 18/518,804

(22) Filed: Nov. 24, 2023

(65) Prior Publication Data

US 2024/0238732 A1 Jul. 18, 2024

(30) Foreign Application Priority Data

Nov. 24, 2022 (BR) .......................... 1020220240027

(51) Int. Cl.
*B01D 67/00* (2006.01)

(52) U.S. Cl.
CPC ..... *B01D 67/0079* (2013.01); *B01D 67/0088* (2013.01); *B01D 67/0095* (2013.01);
(Continued)

(58) Field of Classification Search
CPC ............................ B01D 67/0079; B01D 71/16
See application file for complete search history.

(56) References Cited

U.S. PATENT DOCUMENTS 3,344,214 A * 9/1967 Manjikian et al. .... B01D 71/12 264/41
3,412,184 A * 11/1968 Sharples ............ B01D 67/0013 210/500.25

(Continued)

OTHER PUBLICATIONS

Loeb. S. & Sourirajan S., Sea water demineralization by means of an osmotic membrane, Adv. Chem. Ser., vol. 28, p. 117, 1962.

(Continued)

*Primary Examiner* — Andrew D Graham
(74) *Attorney, Agent, or Firm* — Sterne, Kessler, Goldstein & Fox P.L.L.C.

(57) ABSTRACT

The invention provides polymeric membranes with a mixed matrix and hollow fibers, with high mechanical resistance, useful in high pressure gas permeation processes such as, in particular, the removal of $CO_2$ from raw streams resulting from oil exploration. The membranes are formed by at least one polymeric layer consisting of at least one polymer and an inorganic filler of clay mineral nanoparticles. The respective co-extrusion processes applicable to the production of said membranes are also provided herein.

10 Claims, 6 Drawing Sheets

(52) U.S. Cl.
CPC .... *B01D 2323/081* (2022.08); *B01D 2323/21* (2013.01); *B01D 2323/2181* (2022.08); *B01D 2323/219* (2022.08); *B01D 2323/60* (2022.08)

(56) References Cited

U.S. PATENT DOCUMENTS 3,432,584 A * 3/1969 Cantor ............. B01D 67/00165 264/41
3,439,074 A * 4/1969 Sharples ................ B01D 71/14 264/41
3,592,672 A * 7/1971 Rowley et al. ........... C08L 1/10 264/41
3,646,179 A * 2/1972 Stana ................... B01D 67/003 106/190.1
3,724,672 A * 4/1973 Leonard ................. B01D 69/08 264/41
4,145,295 A * 3/1979 Kutowy ............. B01D 67/0011 264/41
4,234,528 A * 11/1980 Nussbaumer .......... B01D 71/10 536/76
4,340,428 A * 7/1982 Boddeker .............. B01D 71/16 264/45.3
4,496,456 A * 1/1985 Hafez .................... B01D 71/10 264/41
4,541,972 A * 9/1985 Wernick ................. B01D 71/16 264/41
4,609,728 A * 9/1986 Spranger ................... A61L 2/07 422/26
4,678,555 A * 7/1987 Wernick ............. B01D 67/0083 208/321
4,968,430 A * 11/1990 Hildenbrand ........ B01D 61/362 210/640
5,124,128 A * 6/1992 Hildenbrand .............. C08J 9/28 422/420
5,468,430 A * 11/1995 Ekiner ................. B01D 53/228 264/28
5,599,380 A * 2/1997 Koros .................. B01D 53/228 96/4
5,897,817 A * 4/1999 Radovich ........... B01D 67/0088 264/261
9,254,466 B2 * 2/2016 Xiao ...................... B01D 69/02
2003/0141251 A1 * 7/2003 Ji ....................... B01D 67/0011 210/500.21
2008/0237126 A1 * 10/2008 Hoek ................. B01D 69/1214 977/773
2014/0326669 A1 * 11/2014 Flieg .................... B01D 69/087 210/651
2015/0231556 A1 * 8/2015 Ahn ........................ B29C 39/02 427/244
2016/0288058 A1 * 10/2016 Tai ....................... B01D 69/085
2018/0207589 A1 * 7/2018 Martinez ............ B01D 67/0006
2023/0234001 A1 * 7/2023 Liu .................. B01D 67/00793 210/321.6
2024/0238732 A1 * 7/2024 Borges ............... B01D 67/0079

OTHER PUBLICATIONS

Jamil, Asif et al., Development and erformance evaluation of cellulose acetate-bentonite mixed matrix membranes for CO2 separation. Advances in Polymer Technology, v. 2020.
Matsuura et al., Advanced Membrane Technology and Applications, John Wiley & Sons, 2008.

* cited by examiner

PROCESSES FOR PREPARING ASYMMETRIC HOLLOW FIBER MEMBRANES, ASYMMETRIC HOLLOW FIBER MEMBRANES AND USE OF ASYMMETRIC HOLLOW FIBER MEMBRANES

FIELD OF THE INVENTION

The invention is applicable to the production of asymmetric hollow fiber membranes, integral or composite, containing an inorganic filler. The resulting membranes have greater mechanical resistance and can be used in gas separation processes in high pressure environments, such as, for example, the separation of $CO_2$ from natural gas streams on Off-Shore production platforms.

BACKGROUND OF THE INVENTION

Since the discovery of Loeb and Sourirajan, in the 1960s (LOEB. S., SOURIRAJAN S. Sea water demineralization by means of an osmotic membrane, Adv. Chem. Ser., volume 28, page 117, 1962), laboratories, research centers and companies have developed flat polymeric membranes with anisotropic/asymmetric capillary/hollow fiber types using the phase inversion technique. Since then, more advanced processes for synthesizing integral or composite polymeric membranes by co-extrusion (co-casting) (simultaneous double spreading) and/or by double precipitation/coagulation bath have been investigated both for capillary/hollow fibers and for flat membranes.

Each method has particular limitations, however the spinning process presents greater versatility in terms of the system and geometry of the extruders (spinnerets), thus, facilitating the continuous production of integral or composite commercial membranes by simple extrusion or simultaneous triple/quadruple co-extrusion.

Currently, the production of commercial membranes is widely requested to meet various applications requiring liquid-liquid, gas-liquid or gas-gas separation. The membranes are packaged in spiral-type modules in the case of flat membranes or hollow fiber-type modules in tubular casings/pressure vessels. The high degree of packaging of these modules provides a high separation area per equipment volume, suitable for use in limited physical spaces, easy installation and maintenance.

The in situ processing of extracted oil and raw gas resulting from Off-Shore exploration requires the integration of compact and safe equipment in locations with environments that require attention due to the high risk of accidents, in addition to minimizing environmental impacts. Membrane separation technology has the appropriate features to be implemented on an oil platform.

Cellulose acetate and/or tri-acetate membranes have been used for decades. This material presents a high degree of processability, as well as appropriate features with excellent transport properties to be used in gas permeation processes, seawater desalination, ultrafiltration of aqueous and non-aqueous solutions, diafiltration, ion exchange, salt concentration and juices, purification of polluted/contaminated streams and also in hemodialysis as artificial kidneys.

Flat membranes are already used in situ on Off-Shore oil exploration/production platforms. However, pressure losses due to fluid dynamics, problems arising from scaling and the insufficient potential of the degree of packaging of spiral-type modules can be limiting factors in the performance of the treatment of raw gas streams ($CO_2$ removal), whose increasing demand in volume to process requires ever more compact equipment with a larger separation area.

Asymmetric (or anisotropic) membranes of hollow fiber type integral with cellulose acetate (CA) or composed of a matrix of polyetherimide (PEI) or polyethersulfone (PES) on the support and cellulose acetate in the selective layer can be produced. The manufacturing process uses acetone (AO), methylpyrrolidone (NMP), formamide (FO) and dimethylformamide (DMF) as solvents, polyvinylpyrrolidone (PVP) and/or inorganic clay mineral fillers as additives.

The use of inorganic fillers or clay minerals (bentonites) in the polymeric matrix of the membrane can considerably increase its mechanical resistance and transport properties. The resulting mixed matrix membranes are therefore suitable for use in more severe pressure/temperature conditions, in particular for the removal of $CO_2$ in raw gas streams in situ on Off-Shore oil platforms.

For example, Jamil and collaborators (JAMIL, Asif et al. Development and performance evaluation of cellulose acetate-bentonite mixed matrix membranes for $CO_2$ separation. Advances in Polymer Technology, v. 2020, 2020 describe a method for producing asymmetric membranes including an inorganic filler in the cellulose acetate matrix through the dry-wet phase inversion technique.

However, despite presenting increased mechanical resistance compared to a membrane of similar composition, but without the inorganic filler, the membrane of Jamil and collaborators (2020) does not overcome limitations on the amount of clay mineral filler that can be added to the membrane, which, consequently, limits the gain in mechanical resistance provided by the inorganic filler.

SUMMARY OF THE INVENTION

The invention provides asymmetric polymeric membranes of mixed matrix and hollow fibers, with greater mechanical resistance, useful for filtering $CO_2$ in high pressure gas streams. The membranes are formed by at least one polymeric layer and an inorganic filler of clay mineral nanoparticles. The respective production processes of said membranes are also provided here.

In one aspect of the invention, a process is provided for producing an integral asymmetric membrane, in the form of a hollow fiber, comprising a mixed matrix of cellulose acetate (CA) and clay mineral nanoparticles, which comprises:

a. simultaneous extrusion of a polymeric solution comprising cellulose acetate (CA), acetone (AO), formamide (FO) and a clay mineral-type filler, and of an inner liquid with precipitating features in relation to the polymeric solution;
b. immersion in an outer coagulation bath of filtered water between 25 and 80° C.;
c. continuous removal of the fiber formed by a mechanical device;
d. exposure of the formed fiber to a water bath at room temperature, for a period between 24 and 48 hours; and
e. drying the fibers by changing solvents followed by resting at room temperature.

In one embodiment of the process for producing an asymmetric integral membrane according to the invention, the clay mineral filler is composed of bentonite nanoparticles. And, in certain embodiments, the polymeric solution comprises from 23.5 to 26% m/m of cellulose acetate (CA), from 50 to 60% m/m of acetone (AO), from 12.5 to 26.4% m/m of formamide (FO) and 0.1 to 1.5% m/m of bentonite.

In certain instances of the invention, the distance between the extruder and the outer bath (DEB) is maintained between 0 and 100 cm.

In preferred embodiments, the process further comprises spraying a silicone-type elastomeric material onto the dry fibers.

Therefore, the invention also provides an asymmetric hollow fiber integral membrane formed by a mixed matrix of cellulose acetate and bentonite, with the mixed matrix comprising from 0.1 to 1.5% m/m of bentonite.

In a preferred embodiment, the asymmetric hollow fiber integral membrane is additionally coated with a layer of a silicone-type elastomer.

In another aspect of the invention, a process is provided for producing an asymmetric composite membrane, in the form of a hollow fiber, comprising an inner support layer, consisting of a mixed polymeric matrix containing clay mineral nanoparticles, and a selective outer layer, consisting of a cellulose acetate (CA) matrix with or without a clay mineral filler. This method comprises the steps of:

- a. simultaneous extrusion of:
  - i. a first polymeric solution, corresponding to the inner support layer, comprising a polymer selected from polyetherimide (PEI) or polyethersulfone (PES); one or more solvents selected from methylpyrrolidone (NMP), dimethylformamide (DMF), acetone (AO) and formamide (FO); polyvinylpyrrolidone (PVP), as a water-soluble additive; and a clay mineral type filler,
  - ii. a second polymeric solution, corresponding to the selective outer layer, comprising cellulose acetate (CA), acetone (AO), formamide (FO) and, optionally, a clay mineral filler; and
  - iii. an inner liquid with precipitating features in relation to the polymeric solution;
- b. immersion in an outer coagulation bath of filtered water between 25 and 80° C.;
- c. exposure of the formed fiber to a water bath at room temperature, for a period between 24 and 48 hours; and
- d. drying the fibers by changing solvents followed by resting at room temperature.

In one embodiment of the process for producing an asymmetric composite membrane according to the invention, the clay mineral filler is composed of bentonite nanoparticles.

In certain embodiments, the first polymeric solution, corresponding to the inner support layer, comprises from 13.5 to 15% m/m of polyetherimide (PEI) as a base polymer, from 75 to 80% m/m of methylpyrrolidone (NMP), from 3.5 to 11.4% m/m of polyvinylpyrrolidone (PVP) and from 0.1 to 1.5% m/m of bentonite nanoparticles. In these embodiments, the inner liquid with precipitating features in relation to the polymeric solution comprises water and an aprotic solvent such as methylpyrrolidone (NMP) with ratios ranging between 70% $H_2O$:30% NMP (m/m) and 30% $H_2O$:70% MPN (m/m).

In certain embodiments, the first polymeric solution, corresponding to the inner support layer, comprises from 21 to 23% m/m of polyethersulfone (PES) as a base polymer, from 70 to 72% m/m of dimethylformamide (DMF), from 2 to 8% m/m of polyvinylpyrrolidone (PVP) and from 1 to 4% m/m of bentonite nanoparticles. In these embodiments, the inner liquid with precipitating features in relation to the polymeric solution comprises water and an aprotic solvent such as methylpyrrolidone (NMP) with ratios ranging between 70% $H_2O$:30% NMP (m/m) and 30% $H_2O$:70% NMP (m/m) and additionally dimethylformamide (DMF) in the range of 5 to 10% m/m.

In certain embodiments, the first polymeric solution, corresponding to the inner support layer, comprises from 23.5 to 26% m/m of cellulose acetate (CA), from 55 to 60% m/m of acetone (AO) of, from 12.5 to 21.4% m/m of formamide (FO) and from 0.1 to 1.5% m/m of bentonite nanoparticles. In these embodiments, the inner liquid with precipitating features in relation to the polymeric solution comprises pure distilled water and 5 to 10% m/m of a water-soluble polymer of the polyvinylpyrrolidone (PVP) type.

In certain embodiments, the second polymeric solution, corresponding to the selective outer layer, comprises from 24 to 27% m/m of cellulose acetate (CA), from 50 to 60% m/m of acetone (AO), from 13 to 26% m/m of formamide (FO) and 0.1 to 1.5% m/m of bentonite nanoparticles.

In process embodiments for preparing an asymmetric hollow fiber composite membrane, the distance between the extruder and the outer coagulation bath (DEB) is 0 to 100 cm.

In preferred embodiments, the process further comprises spraying a silicone-type elastomeric material onto the dry fibers.

Therefore, the invention also provides an asymmetric hollow fiber composite membrane with an inner support layer, consisting of a mixed matrix containing a polymer selected from polyetherimide (PEI), polyethersulfone (PES) or cellulose acetate (CA), and clay mineral nanoparticles; and a selective outer layer, consisting of a cellulose acetate (CA) matrix with or without clay mineral nanoparticles, in which the mixed matrix of the inner support layer comprises from 0.1 to 4.0% m/m of bentonite.

In a preferred embodiment, the asymmetric hollow fiber composite membrane is additionally coated with a layer of a silicone-type elastomer.

Furthermore, the invention also provides for the use of the asymmetric hollow fiber integral membrane or the asymmetric hollow fiber composite membrane described here for $CO_2$ removal in raw gas stream treatment processes.

BRIEF DESCRIPTION OF THE FIGURES

To assist in identifying the main characteristics of this invention, the following figures are presented.

FIG. 2 shows a representation of the cross-section of the extruder, in which: (2A) represents the hole for passing the polymeric solution (CA, clay) for the production of integral hollow fibers; (2B) represents the hole for passing the polymeric solution (PEI, PES, AC, PVP, clay) to produce the support layer/matrix of composite hollow fibers; and (2C) refers to the hole for the inner liquid to pass through.

DETAILED DESCRIPTION OF THE INVENTION

Figure 1:
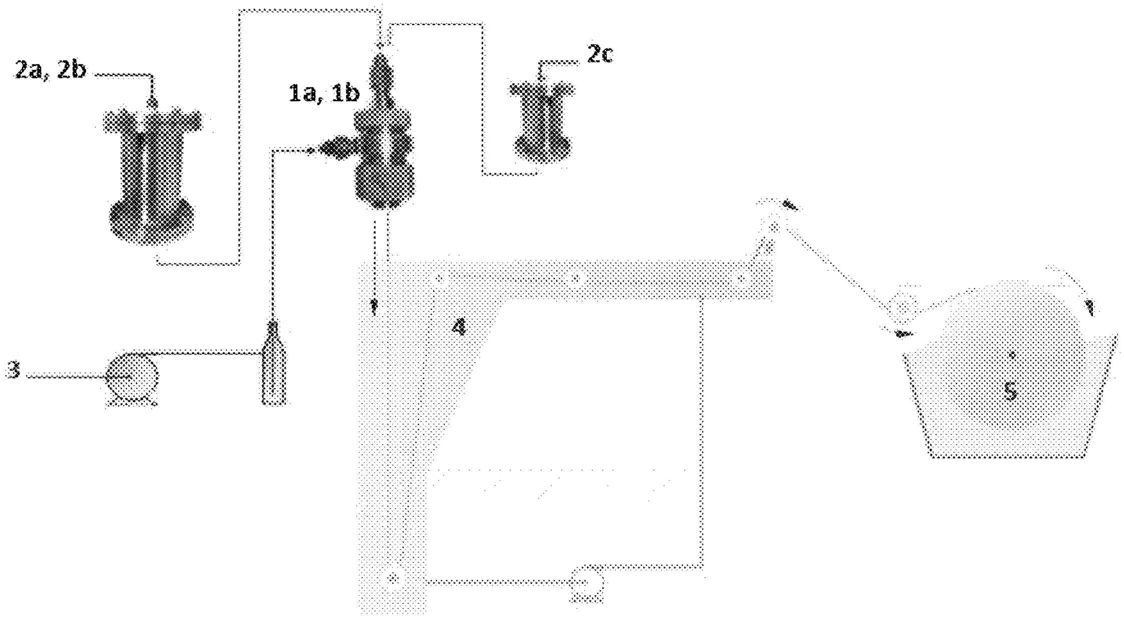
FIG. 1 represents the schematic of the equipment used for spinning, showing a single extruder (1*a*) and, alternatively, a triple extruder (1*b*); an inner liquid reservoir (3), an outer bath (4) and equipment for collecting fiber bundles with spinning speed control. The distance between the extruder and the bath (DEB) is also marked (6).

Unless otherwise specified, terms used throughout this specification have their common meanings in the art, within the context of the disclosure and in the specific context in which each term is used. Certain terms that are used to describe the disclosure are discussed below, or elsewhere in the specification, to provide additional guidance to the practitioner regarding the description of the disclosure. The publications cited herein and the material to which they are cited are specifically incorporated by reference in their entirety.

It will be appreciated that the same thing can be said in different ways. Accordingly, alternative language and synonyms may be used for any one or more of the terms discussed here. No special meaning should be placed on whether a term is elaborated or discussed here. Synonyms for certain terms are provided, but the exemplification of some synonyms does not exclude the potential use of others perhaps not listed here.

The terms "asymmetric membrane" and "anisotropic membrane" are synonymous and relate to the morphology of the membrane. The membranes of the invention are asymmetrical because they have a porous support structure and a thin surface layer, called skin, which may also have pores, but tends to be more closed than the support layer. When the "skin" and the support have the same material constitution, the membrane is said to be "integral"; when the material compositions are different, the membrane is said to be "composite".

The terms "solvent" and "non-solvent" refer to the dissolution properties in relation to the membrane-forming polymer—the main component of the hollow fiber membrane as produced. In this way, polar aprotic liquids (for example DMA (dimethylacetamide), DMF (dimethylformamide), DMSO (dimethyl sulfoxide), NMP (N-methyl-2-pyrrolidone) can be considered "solvents" applicable in the context of the invention, since the membrane-forming polymer can be dissolved in these liquids or mixtures thereof. On the other hand, polar protic liquids such as water, ethanol or organic acids are "non-solvents", since they do not dissolve the membrane-forming polymer.

The term "additive" is used in the context of the invention as any component capable of modifying the interaction between the components of the solution, influencing phase separation. In the case of hollow fibers, the additive aims to increase the viscosity of the solution, facilitating the extrusion step. Non-exhaustive examples include lithium chloride, PVP and organic or inorganic nanoparticles.

The expression "clay mineral filler", in the context of the present invention, refers to a sedimentary material, formed by micrometric particles of one or more minerals derived from natural weathering. There are several types of clay minerals potentially applicable as inorganic fillers in the production of mixed matrix polymeric membranes. For example, montmorillonite, chloisite, kaolin and bentonite are clays employable in the context of the invention.

The term "nanoparticle", in the context of the present invention, refers to any particle of matter with an average diameter equal to or greater than 1 nanometer and less than 100 nanometers.

The "inner liquid" is a fluid that presents precipitating features in relation to the polymeric solution and has in its composition water, solvent and/or a water-soluble polymer.

The invention provides spinning processes for the preparation of mixed matrix membranes with hollow fiber, useful for $CO_2$ separation in high pressure environments. Membranes can be prepared based on one or more polymers combined with an inorganic filler of mineral clay, responsible for providing greater mechanical resistance to the membranes described here.

Figure 2:
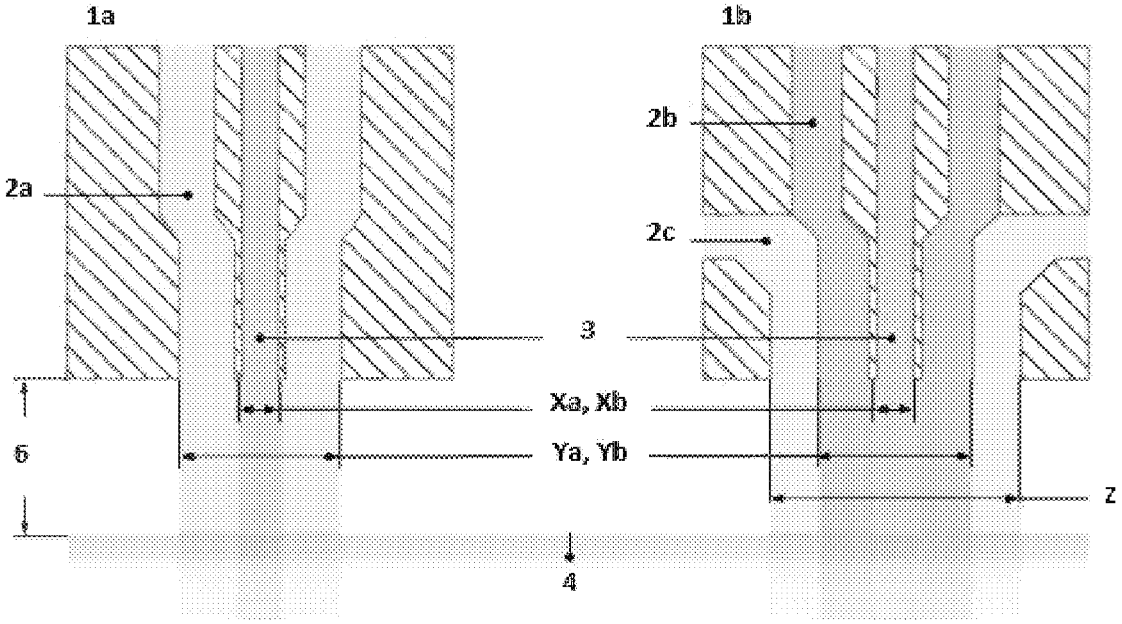

The spinning process basically consists of a simple extruder (1*a*) consisting of two inner channels, through which the polymeric solution (2*a*) flows, and an inner liquid (3) responsible for precipitation of the solution and maintaining the lumen inside the nascent fiber. Upon leaving the extruder, the solution is exposed to the environment for a time defined by the distance between the extruder and the outer precipitation bath (DEB; 6) (FIG. 1, FIG. 2). The degree of affinity between the phases and, therefore, the thermodynamic trajectories followed by the system, which depend on the chemical composition of the polymeric solution and the inner liquid, influence the final morphology of the resulting hollow fibers.

A particular feature of the spinning system for preparing hollow fibers is the double precipitation front, occurring on both the inner and outer surfaces of the membrane. Inner precipitation begins immediately at the exit of the extruder. On the other hand, the precipitation of the outer layer depends on the DEB (6) and the mass transfer between the nascent fiber and the inner liquid (3) that can reach the outer surface of the membrane before immersion in the outer precipitation bath (4).

Generally, the outer precipitation bath consists of microfiltered water only, due to its low cost and environmental reasons. The effect of environmental conditions (humidity, temperature) on the phase inversion mechanism initially occurring in the surface layers of the membrane depends on the exposure time of the nascent fiber and the volatility/hygroscopicity of the solvent(s) present in the polymer solution (2*a*, 2*c*). The degree of solvent evaporation and/or water absorption from the environment during this time interval is proportional to the DEB (6). This phenomenon directly impacts the initial precipitation conditions, influencing the morphological features and, consequently, the surface transport properties of the resulting fiber.

Another particular aspect of preparing hollow fibers is the viscoelastic expansion suffered by the nascent fiber when leaving the extruder and which can cause definitive deformation in its inner and/or outer perimeter. This deformation, called die-swell, is a function of the composition, flow rate and viscosity of the polymeric solution(s) and the inner liquid (3), as well as the distance (6) between the extruder and the outer precipitation bath (DEB).

In order to improve/increase the performance of membranes, additives such as inorganic salts and organic acids are used. The use of inorganic or organic nanoparticles in the concept of mixed matrix membranes controls their surface and mechanical features. These additives alter the interaction between the components of the solution, influencing the phase separation and, consequently, the morphology of the membrane obtained.

In the case of hollow fibers, the membranes are self-supporting, therefore they do not need a non-woven support/ fabric to be produced, unlike flat membranes. In cases where the process requires high operating pressures, clay mineral nanoparticles (bentonites) can be added to the polymeric solution (2*a*, 2*b*, 2*c*) in order to increase its viscosity and, consequently, the mechanical resistance of the resulting fiber.

The simultaneous processing of two polymeric solutions (2*b*, 2*c*) by triple extrusion (1*b*) was developed to produce anisotropic composite membranes of the hollow fiber type. Depending on the process requirements and operating conditions (type of permeation, supply current), the selective layer can be freely placed inside or outside the fibers. In the same way as for simple extrusion (1*a*), the inner liquid flows through the central hole of the extruder, while the polymer solutions of the selective layer (skin) (2*c*) and support (2*b*) are located in the outer and inner annular spaces, respectively or vice versa (FIG. 2).

In the triple extrusion process, delamination between the support and skin layers is a critical factor that can directly affect the integrity of the composite hollow fibers. It occurs when the degree of shrinkage differs between the nascent layers, mainly at the beginning of the phase inversion process. The work of Matsuura et al. (Advanced Membrane Technology and Applications, John Wiley & Sons, Inc. 2008) showed that this phenomenon can be significantly reduced by controlling the viscosity of polymeric solutions, as well as adjusting the ratio between the flow rate of the outer layer solution in relation to the inner.

The invention allows the production of asymmetric hollow fiber membranes, from matrices formed by one (integral) or more polymers (composite) and mixed with nanoparticles of a mineral clay.

Preparation of an Asymmetric Hollow Fiber Membrane Consisting of an Integral Mixed Polymer Matrix The process for producing an asymmetric integral membrane in the form of a hollow fiber, consisting of a mixed matrix of cellulose acetate (CA) with clay mineral nanoparticles comprises the following.

Prepare a polymeric solution (2*a*) containing cellulose acetate (CA) as a base polymer with a concentration in the range of 23.5 to 26% m/m of acetone (AO), in the range of 55 to 60% m/m of formamide (FO), in the range of 12.5 to 21.4% m/m, as solvents, and bentonite, as clay mineral filler, added in the range of 0.1 to 1.5% m/m.

Simultaneous extrusion of the polymeric solution (2*a*) with an inner liquid (3) through simple extruder-type equipment (1*a*). The inner liquid (3) consists of water and has precipitating features in relation to the polymeric solution. The extruder, as seen in FIG. 2, consists of an annular space with an outer diameter (Ya) between 0.8 and 1.4 mm, concentrically to a central orifice with an inner diameter (Xa) between 0.1 and 0.3 mm (as shown in FIG. 2).

After extrusion, the polymeric solution and the inner liquid travel a distance (6) between the extruder and the outer coagulation bath (DEB) (4). During this interval, mass transfer occurs between the polymeric solution (2*a*) and the inner fluid/liquid (3), starting the process of liquid-liquid separation and vitrification of the concentrated phase in the base polymer.

The volume of solvent (AO) evaporated during the residence time between the extruder and the outer bath impacts the initial precipitation conditions, influencing the morphological features and, consequently, the surface transport properties of the resulting fiber. This volume is proportional to the DEB, which is maintained in the range of 0 to 100 cm.

Immersion in an outer coagulation bath (4) of filtered water, with a controlled temperature between 25 and 80° C., completes the vitrification process of the solid phase in the base polymer and fixes the final features of the fiber.

Then, the formed fiber is continuously removed by a mechanical device equipped (5) with speed control and which allows the fiber to be packaged in regular bundles, with a previously established amount of fiber. This device also allows tensioning of the nascent fiber, by adjusting the collection speed in the range of 100 to 120% of the extrusion speed (FIG. 1).

The formed fiber is kept in water baths at room temperature, for a period between 24 and 48 hours, to extract residual solvent and low molar mass additives. The fibers are dried by successively changing solvents, using alcohols to replace water, and non-polar and volatile hydrocarbons to replace alcohols. Evaporation of the final liquid contained in the pores is carried out at room temperature and completes drying.

After drying, the fiber goes through a process of coating with an elastomeric silicone-type material in order to correct any defects present on the surface of the membrane and, in this way, improve its transport properties, in particular selectivity. This process is carried out by a spraying technique. The distance between the nozzle and the membrane surface and the spraying time are defined experimentally to achieve a homogeneous/adequate coating.

Preparation of an Asymmetric Hollow Fiber Membrane Made of a Mixed Composite Polymer Matrix The process for producing an asymmetric composite membrane in the form of a hollow fiber, consisting of a mixed matrix of polyetherimide (PEI) with clay mineral-type nanoparticles in the support layer (inner) and a mixed/integral matrix of acetate cellulose (CA) with or without clay mineral nanoparticles in the surface selective layer, is analogous to the process for preparing the mixed integral polymer matrix membrane.

Initially, the process involves preparing two polymeric solutions corresponding, respectively, to the inner support layer and the outer selective layer. The solution that gives rise to the inner support layer (2*b*) is composed of a base polymer, a solvent, a water-soluble additive and bentonite, in the range between 0.1 and 4% m/m.

In certain embodiments, the base polymer of the inner support layer (2*b*) may be polyetherimide (PEI), polyethersulfone (PES) or cellulose acetate (CA). On occasions where the base polymer is PEI, this corresponds to 13.5 to 15% m/m of the polymeric solution. When the base polymer is PES, its concentration in the polymer solution is in the range between 21 and 23% m/m. When the base polymer is CA, its concentration in the polymer solution is in the range between 23.5 and 26% m/m.

In particular embodiments, the solvent can be methylpyrrolidone (NMP), dimethylformamide (DMF), acetone (AO) and/or formamide (FO). When NMP is the selected solvent, it is added to the polymer solution of the inner support layer in the range of 75 to 80% m/m. When DMF is the solvent chosen for the inner support layer, then it is added in a range between 70 and 72% m/m. In particular cases, AO and FO are used together in concentrations ranging, respectively, from 55 to 60% m/m and from 12.5 to 21.4% m/m.

Particularly, in the embodiments in which the base polymer of the inner support layer (2*b*) is CA, the solvents AO and FO are used together in the amounts reported above.

The water-soluble additive of the inner support layer (2*b*) is preferably polyvinylpyrrolidone (PVP). In certain embodiments, it is present in the range of 3.5 to 11.4% m/m and, in other particular embodiments, it is present in the range of between 2 and 8% m/m.

The solution that gives rise to the outer selective layer (2*c*) is composed of cellulose acetate (CA), as the base polymer, in the range between 24 and 26% m/m, acetone (AO) and formamide (FO), as solvents, in the ranges of 55 to 60% m/m and 14 to 21% m/m, respectively. Optionally, bentonite nanoparticles may be present in the range of 0.1 to 1.5% m/m.

Next, the polymeric solutions (2*b*, 2*c*) pass simultaneously through a triple extruder (1*b*), together with an inner liquid (3). The inner liquid (3) has precipitating features in relation to the polymeric solution and is made up of water and an aprotic solvent such as methylpyrrolidone (NMP), which has a physicochemical affinity with the polymeric solution, with proportions that vary between 70%/30% m/m and 30%/70% m/m, respectively.

Alternatively, the inner liquid with a $H_2O$/NMP composition of 30/70% m/m may also contain a water-soluble polymer of the polyvinylpyrrolidone (PVP) type. Another particular embodiment of the inner liquid comprises distilled water and polyvinylpyrrolidone (PVP) in the range of 5 to 10% m/m. The presence of the water-soluble polymer regulates the mass transfer rates between the polymeric solution (2*b*) and this liquid, as well as controlling the viscoelastic expansion effect at the extruder exit, allows uniformity in the thickness and inner perimeter of the fiber to be obtained.

Additionally, the inner liquid (3) may contain a solvent that has physicochemical affinity with the polymer solution, such as dimethylformamide (DMF). In these embodiments, DMF is present in the range between 5 to 10% m/m.

In its turn, the triple extruder (1*b*) consists of an annular space with an outer diameter (Z) between 1.2 and 1.4 mm, concentrically to a second inner annular space with an outer diameter (Yb) between 0.8 and 1 mm and a central hole with an inner diameter (Xb) between 0.1 and 0.2 mm (as shown in FIG. 2).

Analogous to the previous process, the polymeric solutions (2*b*, 2*c*) and the inner liquid (3) travel a distance (6) between the extruder and the outer coagulation bath (DEB) (4). During this interval, mass transfer occurs between the polymeric solution (2*a*) and the inner fluid/liquid (3), starting the process of liquid-liquid separation and vitrification of the concentrated phase in the base polymer.

Again, the volume of solvent (AO) evaporated during the residence time between the extruder and the outer bath impacts the initial precipitation conditions, influencing the morphological features and, consequently, the surface transport properties of the resulting fiber. This volume is proportional to the DEB, which is maintained in the range of 0 to 100 cm.

Immersion in an outer coagulation bath (4) of filtered water with a controlled temperature between 25 and 80° C. completes the vitrification process of the solid phase in the base polymers and fixes the final features of the fiber.

Then, the formed fiber is continuously removed by a mechanical device equipped (5) with speed control and which allows the fiber to be packaged in regular bundles, with a previously established amount of fiber. This device also allows tensioning of the nascent fiber, by adjusting the collection speed in the range of 100 to 120% of the extrusion speed (FIG. 1).

The formed fiber is kept in water baths at room temperature, for a period between 24 and 48 hours, to extract residual solvent and low molar mass additives. The fibers are dried by successively changing solvents, using alcohols to replace water, and non-polar and volatile hydrocarbons to replace alcohols. Evaporation of the final liquid contained in the pores is carried out at room temperature and completes drying.

After drying, the fiber goes through a coating process with an elastomeric silicone-type material in order to correct any defects present on the surface of the membrane and, in this way, improve its transport properties, in particular selectivity. This process is carried out by a spraying technique. The distance between the nozzle and the membrane surface and the spraying time are defined experimentally to achieve a homogeneous/adequate coating.

Asymmetric Hollow Fiber Membranes

The invention provides for asymmetric polymeric membranes with a mixed matrix and hollow fibers, prepared using the processes described. In all embodiments, the membranes are formed by at least one polymeric layer and an inorganic filler of clay mineral nanoparticles. The presence of clay mineral in the polymeric matrix that constitutes at least one of the membrane layers increases the mechanical resistance of the membranes without reducing the selectivity for $CO_2$ filtration.

In one aspect, an asymmetric hollow fiber integral membrane formed by a mixed matrix of cellulose acetate and nanoparticles of the clay mineral bentonite is provided, with the mixed matrix comprising from 0.1 to 1.5% m/m of bentonite.

In another aspect, the invention provides an asymmetric hollow fiber composite membrane with an inner support layer, consisting of a mixed matrix containing a polymer selected from polyetherimide (PEI), polyethersulfone (PES) or cellulose acetate (CA), and clay mineral nanoparticles; and a selective outer layer, consisting of a cellulose acetate (CA) matrix with or without clay mineral nanoparticles, in which the mixed matrix of the inner support layer comprises from 0.1 to 4.0% m/m of bentonite.

In preferred embodiments of the asymmetric hollow fiber membrane, whether integral or composite, the membrane is additionally coated with a layer of a silicone-type elastomer.

Application of Asymmetric Hollow Fiber Membranes

Finally, the invention provides for the use of the described membranes to remove $CO_2$ from raw gas streams in treatment processes, particularly those conducted in situ, that is, on an Off-Shore oil exploration/production platform.

Next, the invention will be illustrated through examples of embodiments, which do not exhaust all the possibilities achievable by the inventive concept described here, but represent all modalities. The examples below are presented in order to provide the person skilled in the art with a complete description of how the hollow fiber membranes of this invention are prepared, evaluated and used. One skilled in the art, in light of the present disclosure, will recognize that many changes can be made to the specific embodiments that are disclosed and still obtain a similar or equivalent result without departing from the spirit and scope of the invention.

EXAMPLES

Example 1—Production of Integral Hollow Fiber Membrane without Clay Mineral Filler An integral hollow fiber type membrane identified as AC_01 was produced. A polymeric solution (2*a*) was prepared with a concentration of cellulose acetate (CA) of 25% m/m as base polymer, acetone (AO) of 60% m/m and formamide (FO) of 15% m/m as solvents. No clay mineral nanoparticles were added.

The reagents were mixed together under mechanical stirring until the polymeric solution was homogeneous. The resulting polymeric solution (2*a*) is left to rest for 24 hours inside a stainless steel tank. It is then pumped towards the simple extruder (1*a*).

The wiring conditions are as follows:

a) Flow rate of the polymer solution: 6 [g/min]
b) Inner liquid flow: 1.5 [ml/min]
c) Retraction speed [m/min]: 8 m/min
d) Temperature of the outer coagulation bath (microfiltered water): 24° C.
e) Room temperature: 22° C.
f) DEB: 5 cm There are no photomicrographs of this batch of membrane. Note that a thin layer of silicone-type elastomer was deposited on the outer surface of the membrane in order to correct any defects present.

Figure 6:
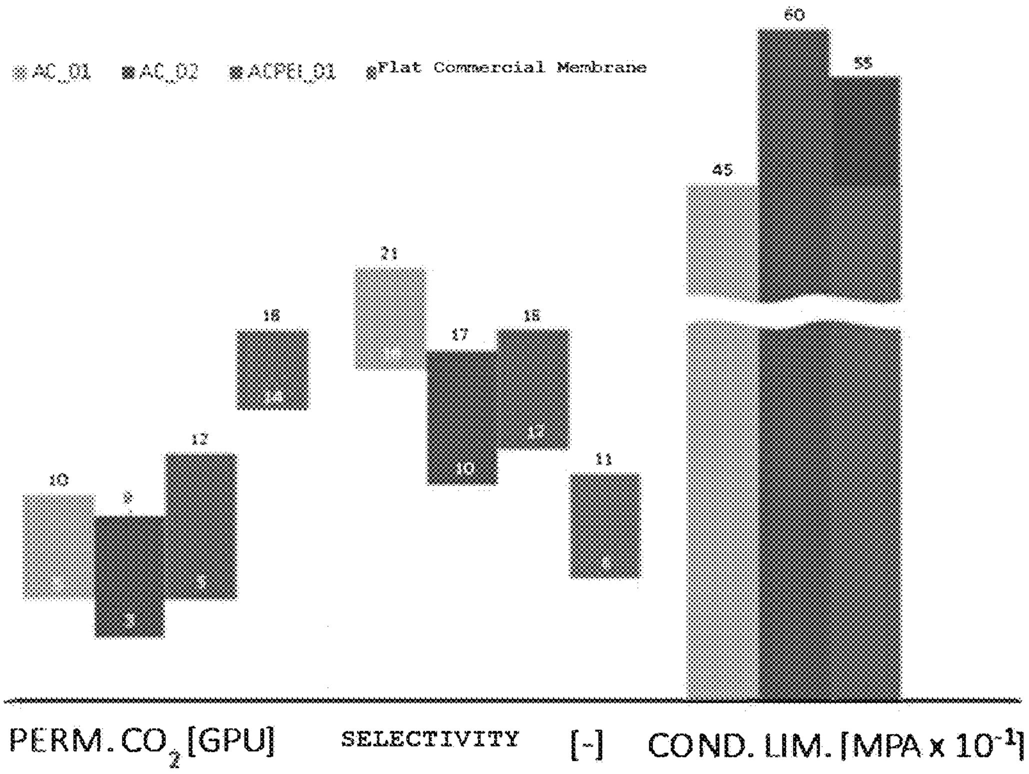
FIG. 6 illustrates the superior performance of the membranes of the invention, compared to a commercially available membrane, in tests of permeance to $CO_2$, selectivity between $CO_2$ and $CH_4$ and mechanical resistance.

The permeation test was carried out with an ideal mixture of $CH_4/CO_2$ type with a composition of 70/30% m/m, using a module previously packed with the fibers produced in this example. The membranes show a permeance to $CO_2$ ranging between 5 and 10 [$10^{-6}$ $cm^3$(STP)$cm^{-2}$ $s^{-1}$ $cmHG^{-1}$] or [GPU], up to 21 times greater than the permeance to $CH_4$. The fibers ruptured when the pressure reached 4.5 MPA (FIG. 6).

Example 2—Production of Integral Hollow Fiber Membrane with Clay Mineral Filler

An integral hollow fiber type membrane identified as AC_02 was produced. A polymeric solution (2*a*) was prepared with a concentration of cellulose acetate (CA) of 24% m/m as base polymer, acetone (AO) of 60% m/m and formamide (FO) of 15% m/m as solvents. The concentration of the clay mineral filler of bentonite nanoparticles was 1% m/m.

Initially the nanoparticles are dispersed in formamide (FO). At this stage, ultrasound-type equipment was used in order to optimize the degree of clay swelling and obtain a homogeneous suspension. In parallel, the polymer (CA) is dissolved in the solvent (AO) under mechanical stirring until the solution is homogeneous. Then, the suspension (FO+Clay) is added to the solution (CA+AO).

The resulting polymer solution (2*a*) can then be pumped towards the simple extruder (1*a*). The resulting polymeric solution (2*a*) is left to rest for 24 hours inside a stainless steel tank. It is then pumped towards the simple extruder (1*a*).

Figure 3:
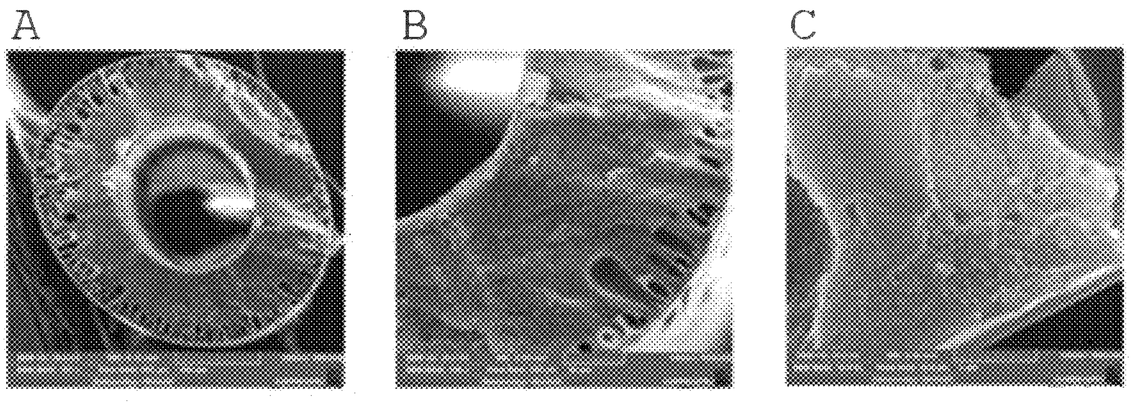
FIG. 3 shows representative photomicrographs of an asymmetric hollow fiber integral membrane according to the invention.

The wiring conditions are as follows:

g) Flow rate of the polymer solution: 6 [g/min]
h) Inner liquid flow: 1.5 [ml/min]
i) Retraction speed [m/min]: 8 m/min
j) Temperature of the outer coagulation bath (microfiltered water): 24° C.
k) Room temperature: 22° C.
l) DEB: 5 cm The morphology of the hollow fibers obtained is shown in FIG. 3*a, b, c*. The fiber has an outer diameter of approximately 750 μm with a wall thickness of 250 μm. Note a dense morphology with finger-like macropores in the region close to the outer surface of the membrane. Note whether a thin 2 μm layer of silicone-type elastomer was deposited on the outer surface of the membrane (FIG. 3*c*).

The permeation test was carried out with a real mixture of $CH_4/CO_2$ type with a composition of 70/30% m/m, using a module previously packed with the fibers produced in this example. The membranes show a permeance to $CO_2$ ranging between 3 and 9 [$10^{-6}$ $cm^3$(STP)$cm^{-2}$ $s^{-1}$ $cmhg^{-1}$] or [GPU], up to 17 times greater than the permeance to $CH_4$. The fibers ruptured when the pressure reached 6.0 MPA (FIG. 6).

Example 3—Production of Hollow Fiber Composite Membrane with Clay Mineral Filler A hollow fiber composite membrane identified as ACPEI_01 was produced. A polymeric solution (2*b*) was prepared with a concentration of polyetherimide (PEI) of 14% m/m as base polymer, methylpyrrolidone (NMP) of 75% as solvent, polyvinylpyrrolidone (PVP) of 10% m/m as a water-soluble additive. The concentration of the clay mineral filler (bentonite) was 1% m/m. Initially the nanoparticles are dispersed in methylpyrrolidone (NMP). At this stage, ultrasound-type equipment was used in order to optimize the degree of clay swelling and obtain a homogeneous suspension. Then, the polymer (PEI) and the additive (PVP) are dissolved in the suspension (NMP+Clay) under mechanical stirring until the solution is homogeneous.

A polymeric solution (2*c*) was prepared with a concentration of cellulose acetate (CA) of 26.7% m/m as base polymer, acetone (AO) of 50% m/m and formamide (FO) of 23.3% m/m as solvents.

The resulting polymeric solutions (2*b* and 2*c*) are left to rest for 24 hours inside stainless steel tanks. They will then be pumped towards the triple extruder (1*b*).

Figure 4:
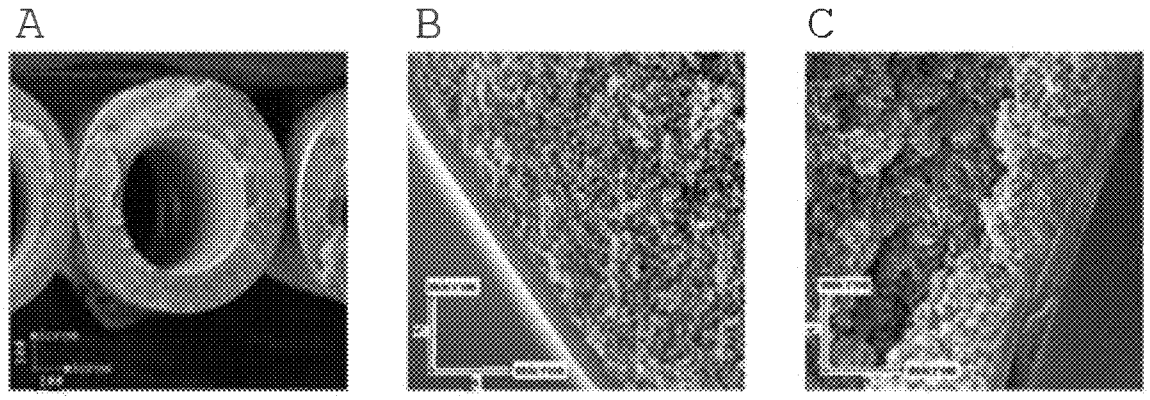
FIG. 4 shows representative photomicrographs of an asymmetric hollow fiber composite membrane according to the invention.

The wiring conditions are as follows:

a) Flow rate of the polymer solution (2*b*): 6 [g/min]
b) Flow rate of the polymer solution (2*c*): 1.5 [g/min]
c) Inner liquid flow: 2.4 [ml/min]
d) Retraction speed: 2 [m/min]
e) Temperature of the outer coagulation bath (microfiltered water): 24° C.
f) Room temperature: 22° C.
g) DEB: 2.4 cm The morphology of the hollow fibers obtained is shown in FIG. 4*a, b, c*. The fibers have an outer diameter of approximately 875 μm with a wall thickness of 200 μm. An adequate adhesion can be observed between the selective dense layer of cellulose acetate located on the outer surface of the membrane and the polyetherimide (PEI) support layer presenting an anisotropic morphology with interconnected pores (FIG. 4*c*). Similarly for AC_01 and AC_02, a thin layer of silicone-type elastomer was deposited on the outer surface of the membrane.

Figure 5:
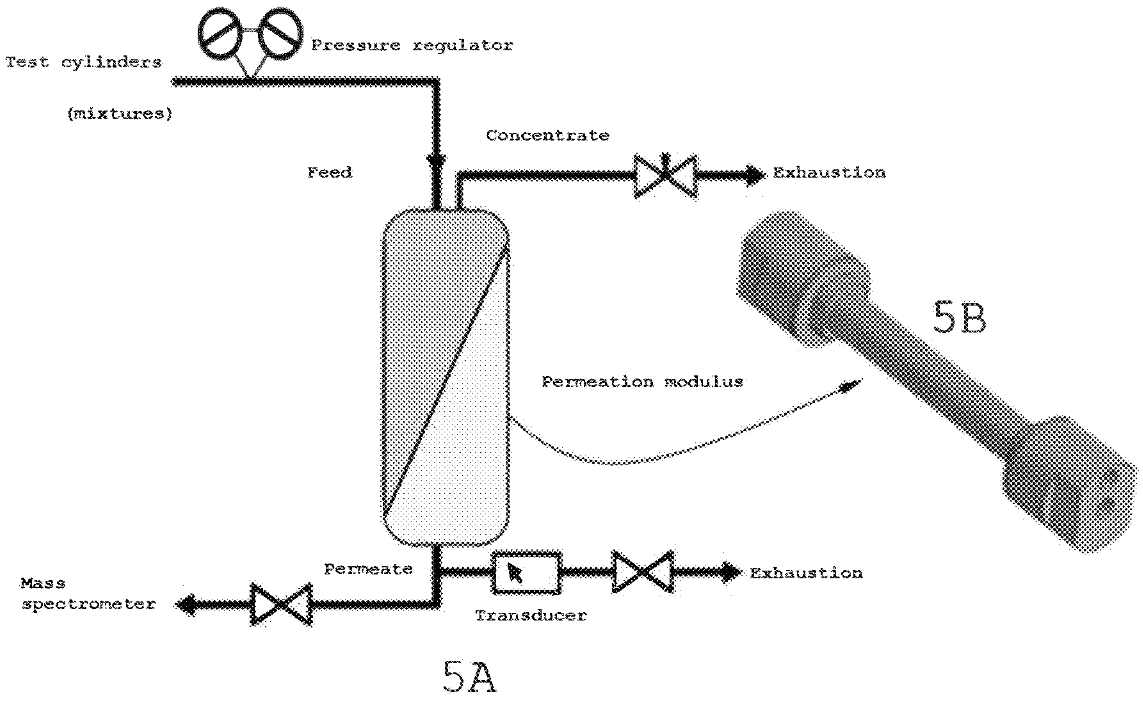
FIG. 5 illustrates the configuration of a system for testing the permeance, selectivity and mechanical resistance of the membranes of the invention.

The permeation test was carried out with a real $CH_4/CO_2$ mixture with a composition of 70/30% m/m, using a hollow fiber module (FIG. 5*b*) previously packaged with the fibers produced in this example. The membranes show a permeance to $CO_2$ ranging between 5 and 12 [10$^{-6}$ $cm^3$(STP) $cm^{-2}$ $s^{-1}$ $cmhg^{-1}$] or [GPU], up to 18 times greater than the permeance to $CH_4$. The fibers ruptured when the pressure reached 5.5 MPA (FIG. 6).

The addition of nanoparticles had no relevant impact on the transport properties of the fibers produced, while the mechanical resistance was consequently increased (between 20 and 25%).

The composite membrane has higher permeance values compared to integral membranes as it is a selective layer of thin cellulose acetate (CA) offering less resistance to transport.

A test was carried out with a flat commercial membrane under the same conditions as in examples 1, 2 and 3. It should be noted that the hollow fiber type membranes produced present a much higher $CO_2/CH_4$ selectivity compared to the commercial membrane, while the permeance to $CO_2$ presents proportionally lower values.

The invention claimed is:

1. A process for producing an integral asymmetric membrane in the form of a hollow fiber, the integral asymmetric membrane comprising a mixed matrix of cellulose acetate (CA) with clay mineral nanoparticles, the process comprising:

simultaneous extrusion of a polymeric solution comprising cellulose acetate (CA), acetone (AO), formamide (FO), and a clay mineral filler, and of an inner liquid with precipitating features in relation to the polymeric solution;

immersion in an outer coagulation bath of filtered water between 25° C. and 80° C.;

continuous removal of a formed fiber by a mechanical device;

exposure of the formed fiber to a water bath for a period between 24 hours and 48 hours; and drying the fibers, wherein the drying comprises changing solvents followed by evaporating remaining liquid.

2. The process of claim 1, wherein the clay mineral filler is composed of bentonite nanoparticles.

3. The process of claim 1, wherein the polymeric solution comprises from 23.5% to 26% m/m of cellulose acetate (CA), from 50% to 60% m/m of acetone (AO), from 12.5% to 26.4% m/m of formamide (FO), and from 0.1% to 1.5% m/m of bentonite.

4. The process of claim 1, wherein the distance between an extruder and an outer coagulation bath is defined between 0 cm and 100 cm.

5. The process of claim 1, further comprising, after drying the fibers step, spraying a silicone elastomeric material onto the dry fibers.

6. The process of claim 1, wherein the simultaneous extrusion comprises:

flowing the inner liquid through a central hole of an extruder; and flowing the polymeric solution through an annular space that surrounds the central hole.

7. The process of claim 1, wherein the water bath is at room temperature.

8. The process of claim 1, wherein the evaporating remaining liquid is done by resting at room temperature.

9. The process of claim 1, wherein the integral asymmetric membrane has a permeance to $CO_2$ ranging between 5 GPU and 10 GPU.

10. The process of claim 1, wherein the changing solvents comprises replacing water with alcohol, followed by replacing the alcohol with non-polar and volatile hydrocarbons.

* * * * *